United States Patent [19]
Suzuki et al.

[11] Patent Number: 5,663,998
[45] Date of Patent: Sep. 2, 1997

[54] X-RAY IMAGING APPARATUS AND AUTOMATIC DENSITY CORRECTION METHOD

[75] Inventors: Masakazu Suzuki; Yoshio Uejima; Takeshi Hayashi, all of Kyoto, Japan

[73] Assignee: J. Morita Manufacturing Corporation, Kyoto, Japan

[21] Appl. No.: 654,037

[22] Filed: May 28, 1996

[30] Foreign Application Priority Data

Aug. 29, 1995 [JP] Japan ................................ 7-220699

[51] Int. Cl.$^6$ .............................................. G01N 23/04
[52] U.S. Cl. .................................... 378/62; 378/98.7
[58] Field of Search ................... 364/413.12, 413.24; 378/62, 98, 98.8, 98.7

[56] References Cited

U.S. PATENT DOCUMENTS 4,467,351 8/1984 Wang ........................................ 358/111
5,177,775 1/1993 Onodera et al. ......................... 378/99

FOREIGN PATENT DOCUMENTS 5-95512  4/1993  Japan .

*Primary Examiner*—David P. Porta
*Assistant Examiner*—David Vernon Bruce
*Attorney, Agent, or Firm*—Koda and Androlia

[57] ABSTRACT

In step s1, X-ray imaging is performed, and an image signal linear to the intensity of X-rays is stored in an image memory 7. Next, in step s2, the maximum from among image data is detected, and the maximum is set as reference value N0. In step s3, image data N is logarithmically converted in accordance with the following equation (a), and the converted data is stored in an image memory 7.

$$d = \beta \cdot \log(N0/N) \quad \ldots (a)$$

where d is image data after correction and has a logarithmic relationship to the X-ray intensity, and $\beta$ is a constant. Then, the image data logarithmically converted for density correction is displayed by a display unit 6 in step 4.

6 Claims, 4 Drawing Sheets

---

1. PERFORM X-RAY IMAGING  s1

2. DETECT MAXIMUM FROM AMONG IMAGE DATA (MAXIMUM X-RAY DOSAGE DATA) AND SET THE MAXIMUM AS REFERENCE VALUE N0  s2

3. CONVERT EACH IMAGE DATA IN ACCORDANCE WITH THE FOLLOWING EQUATION:
$d = \beta \times \log(N0/N)$
$\beta$ IS A PRESET VALUE.
WHEN DISPLAY IS PERFORMED WITH A 256-STEP GRADATION, FOR EXAMPLE, THE FOLLOWING VALUE IS USED
$\beta = 255/\log(1/0.16) = 139$
ALTERNATIVELY,
VALUE OBTAINED FROM EQUATION (b) IS USED  s3

4. DISPLAY IMAGE DATA  s4

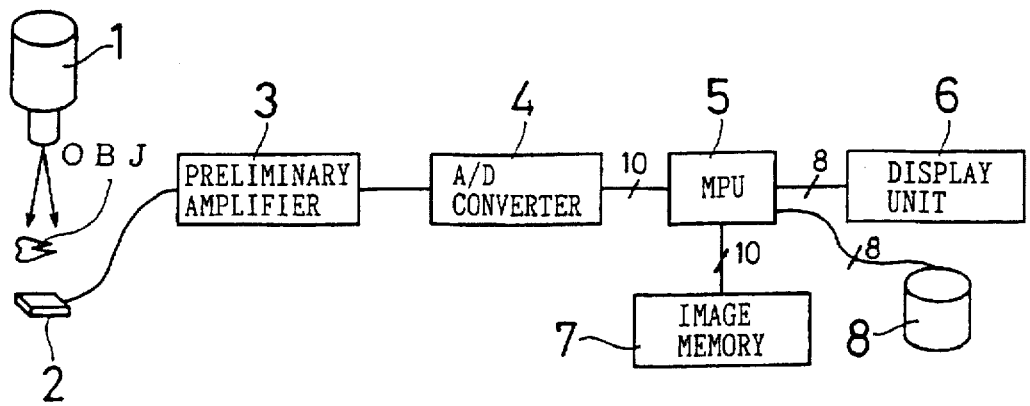

| 1. PERFORM X-RAY IMAGING | s1 |

| 2. DETECT MAXIMUM FROM AMONG IMAGE DATA (MAXIMUM X-RAY DOSAGE DATA) AND SET THE MAXIMUM AS REFERENCE VALUE N0 | s2 |

3. CONVERT EACH IMAGE DATA IN ACCORDANCE WITH THE
FOLLOWING EQUATION:
$d = \beta \times \log(N0/N)$
$\beta$ IS A PRESET VALUE.
WHEN DISPLAY IS PERFORMED WITH A 256-STEP GRADATION, FOR EXAMPLE, THE FOLLOWING VALUE IS USED
$\beta = 255/\log(1/0.16) = 139$
ALTERNATIVELY,
VALUE OBTAINED FROM EQUATION (b) IS USED                                     s3

| 4. DISPLAY IMAGE DATA | s4 |

INSUFFICIENT X-RAY INTENSITY
(WHITISH AS A WHOLE)

PROPER X-RAY INTENSITY
(PROPER IMAGE)

EXCESSIVE X-RAY INTENSITY
(BLACKISH AS A WHOLE)
(PARTIALLY SATURATED)

X-RAY IMAGING APPARATUS AND AUTOMATIC DENSITY CORRECTION METHOD

BACKGROUND OF THE INVENTION

1. Field of the Invention

The present invention relates to an X-ray imaging apparatus for performing X-ray imaging of the oral cavity or other portions of the human body, for detecting X-ray images by using an X-ray imaging device, such as a CCD (charge-coupled device), sensor, a MOS (metal-oxide semiconductor) sensor or an ionization chamber and for displaying the X-ray images, as well as to an automatic density correction method for the apparatus.

2. Description of the Related Art

FIG. 5 is a block diagram showing an embodiment of a conventional X-ray imaging apparatus. When X-rays are emitted from an X-ray generator 51 toward a subject OBJ, the X-ray image of the subject OBJ is detected by a CCD sensor 52 and converted into an electrical signal. At this time, the CCD sensor B2 outputs an analog signal proportional to the intensity of the received X-rays.

The analog signal is amplified by a predetermined amplification factor by a preliminary amplifier 53 of the next stage, and converted into a digital signal with a quantum of 8 or 10 bits, for example, by an AD (analog-digital) converter 54 provided at the further next stage. The digital image signal is then directly delivered to an image display unit 55 and displayed on a CRT (cathode-ray tube), a liquid crystal display panel or the like.

Since the image data obtained after AD conversion is directly displayed in the case of the conventional X-ray imaging apparatus, the data is displayed as a signal being linear to the intensity of X-rays.

FIGS. 6A, 6B and 6C are graphs, each showing the relationship between input data and display density after AD conversion. The abscissa indicates the input data "in" and the ordinate indicates the display density "out" of the image display unit 55. As the incoming X-ray dosage to the CCD sensor 51 increases, the signal level of the input data "in" becomes higher, and it is assumed that the display screen becomes blackish.

First, in FIG. 6A, although the relationship between the input data and the display density is linear, since the inclination of the linear portion is gentle, the display density is low and the display screen becomes whitish as a whole, indicating that the intensity of the X-rays having reached the CCD sensor 51 is insufficient.

In FIG. 6B, since the relationship between the input data and the display density is linear and the inclination of the linear line is approximately 45 degrees, both the display density and the X-ray intensity are proper.

In FIG. 6C, although the relationship between the input data and the display density is linear in the low dosage region, the display density is saturated to a pinch-black condition at a certain dosage or higher. The entire screen becomes blackish as a whole, indicating that the X-ray intensity is excessive.

When the intensity of X-rays having reached the CCD sensor 52 is excessive (over exposure) or insufficient (under exposure), the display density of the image display unit changes significantly, and the image cannot be used for diagnosis. Since the intensity of X-rays having reached the sensor changes greatly depending on the properties and thickness of the subject OBJ, it is considerably difficult to set the image signal level within a proper display density range. In addition, a repeated X-ray imaging increases radiation dosage, and should be avoided as much as possible. In particular, when the X-ray intensity is excessive during dental X-ray imaging, a saturated portion tends to be mistaken for dental caries, and there is a possibility of a wrong diagnosis.

As related art, Japanese Laid-open Patent Application No. Hei 5-95512 relates to an X-ray digital angiography apparatus, and discloses a method for detecting the maximum and minimum of the output data of an AD converter and for writing the contents of a look-up table. However, this method has the following problems: 1) Both the maximum and minimum of image data are necessary; 2) The method for actually creating the look-up table is not described; 3) The look-up table is not optimized; and 4) The method is applicable only to angiography using an X-ray TV.

SUMMARY OF THE INVENTION

The object of the present invention is to provide an automatic density correction method for an X-ray imaging apparatus to enable displaying images at proper density and contrast even when the intensity of X-rays is excessive or insufficient.

The invention is concerned with an X-ray imaging apparatus provided with an X-ray imaging means for detecting an image of X-rays having passed through a subject and for outputting an image signal proportional to the dosage of incoming X-rays, comprising:

an AD converting means for AD-converting the image signal outputted from the X-ray imaging device;

an image memory for storing the image signal having been converted into digital data;

a maximum reference value extracting means for extracting reference value N0 at which a X-ray dosage is high and the signal level is maximum, from the images stored in the image memory;

a logarithmic converting means for logarithmically converting image signal N stored in the image memory in accordance with the following equation:

$$d = \beta \cdot \log(N0/N)$$

where d is an image signal after correction, and $\beta$ is a constant.

Furthermore, the invention is concerned with an X-ray imaging apparatus provided with an X-ray imaging means for detecting an image of X-rays having passed through a subject and for outputting an image signal proportional to the dosage of incoming X-rays, wherein the image signal outputted from the X-ray imaging device is AD-converted and stored in the image memory, reference value N0 at which a X-ray dosage is high and the signal level is maximum is extracted from the stored image data, and image signal N stored in the image memory is logarithmically converted in accordance with the following equation:

$$d = \beta \cdot \log(N0/N)$$

where d is an image signal after correction, and $\beta$ is a constant so as to perform automatic density correction.

In accordance with the invention, the imaging region (latitude) can be extended significantly by logarithmically converting a signal proportional to X-ray intensity. Furthermore, the reference value N0 corresponding to a high X-ray dosage and the maximum signal level is extracted from the stored image data and used for the logarithmic conversion. Consequently, displaying is possible at a proper density at all times even when an X-ray dosage determined depending on a X-ray tube voltage, X-ray tube current, irradiation time, etc. is excessive or insufficient.

Furthermore, since the X-ray dosage for imaging can be adjusted in a wide range, the S/N ratio of the image can be controlled. Consequently, a desired X-ray dosage can be selected in accordance with the object of imaging.

The operating principle of the invention will be described in detail below. When the thickness of the subject is t and the X-ray absorption coefficient of the subject is $\mu$, the intensity P of X-rays having passed through the subject is represented by the following equation (1):

$$P = P0 \cdot \exp(-\mu \cdot t) \quad \ldots (1)$$

In the equation, P0 represents the intensity of X-rays before the entry of X-rays into the subject. It is preferable that the display data of the subject is represented by a product of the thickness t of the subject and X-ray absorption coefficient $\mu$. The following equation (2) can be obtained by modifying the equation (1).

$$\log(P) = \log(P0) - \mu \cdot t \therefore \mu \cdot t = \log(P0/P) \quad \ldots (2)$$

In the equation (2), the X-ray intensity P corresponds to the image signal N from the CCD sensor. In addition, log (P0) is determined depending on imaging conditions and corresponds to the value obtained in an area other than the subject. By substituting N for P and N0 for P0, and by multiplying the equation (2) by constant $\beta$, the equation (2) can be converted into image signal d as shown in the following equation (3):

$$d = \beta \cdot \mu \cdot t = \beta \cdot \log(P0/P) \quad \ldots (3)$$

In case the image signal d is an 8-bit digital value, it is in the range of 0 to 288.

Since density correction is performed so as to faithfully represent the product of the thickness t of the subject and the X-ray absorption coefficient $\mu$ as described above, the X-ray image of the subject can be displayed in high quality.

Furthermore, in the invention, when the reference value N0 is extracted, a histogram of the image signals N is created and the image signals N are accumulated in increasing order of signal level. The reference value N0 is extracted in a range wherein the quantity of the accumulated data corresponds to 80 to 100% of the whole data.

In accordance with the invention, the reference value N0 having a proper value for an essential image can be extracted without any adverse effects of high-density noise even when such noise is superimposed, thereby ensuring stable density correction.

Furthermore, in accordance with the invention, when reference value N1 at which a X-ray dosage is low and the signal level is minimum is extracted from the stored image data, and when the quantization maximum after density correction is dmax, the constant $\beta$ can be determined by the following equation:

$$\beta = dmax/(\log(N0/N1))$$

Furthermore, in accordance with the invention, the constant $\beta$ can be determined easily and the detected image signal can be displayed in a proper density range. Consequently, the X-ray image of the subject can be displayed in proper density and contrast.

Furthermore, in the invention, when the reference value N1 is extracted, a histogram of the image signals N is created and the image signals N are accumulated in increasing order of signal level. The reference value N1 is extracted in a range wherein the quantity of the accumulated data corresponds to 0 to 200% of the whole data.

In accordance with the invention, the reference value N1 having a proper value for an essential image can be extracted without any adverse effects of low-density noise even when such noise is superimposed, thereby ensuring stable density correction.

Furthermore, in accordance with the invention, when reference value N1 at which a X-ray dosage is low and the signal level is minimum is extracted from the stored image data, and when the quantization maximum after density correction is dmax, the constant $\beta$ 1 can be determined by the following equation:

$$\beta 1 = dmax/(\log(N0/N1))$$

Constant $\alpha = N0/N1$, is previously determined in the range of 0.08 to 0.23, and constant $\beta$ 2 is determined by the following equation:

$$\beta 2 = dmax/\log(\alpha)$$

Next, the constant $\beta$ 1 is compared with the constant $\beta$ 2, and the larger one is adopted as the constant $\beta$.

In accordance with the invention, even when the incoming X-ray dosage fluctuates greatly because of the changes in the subject conditions and imaging conditions, image displaying is possible in a proper density at the maximum contrast by adopting the preset constant $\beta$ 2, whereby a stable, easy-to-observe image can be obtained.

As described above, the imaging region (latitude) can be extended significantly, since an image signal linear to X-ray intensity is logarithmically converted by using the predetermined conversion equation and displayed. Furthermore, the reference value N0 at which a X-ray dosage is high and the signal level is maximum is extracted and the logarithmic conversion is performed by using the reference value N0. Consequently, displaying is possible at a proper density and contrast at all times even when an X-ray dosage during imaging is excessive or insufficient.

Furthermore, since the X-ray dosage for imaging can be adjusted in a wide range, the S/N ratio of the image can be controlled. Consequently, a desired X-ray dosage can be selected in accordance with the purpose of imaging.

BRIEF DESCRIPTION OF THE DRAWINGS

Other and further objects, features, and advantages of the invention will be more explicit from the following detailed description taken with reference to the drawings wherein:

FIG. 1 is a block diagram showing a configuration in accordance with an embodiment of the invention;

FIG. 2 is a flowchart showing a signal processing operation in accordance with the invention;

CONFIGURATION OF THE INVENTION

Figure 3A:
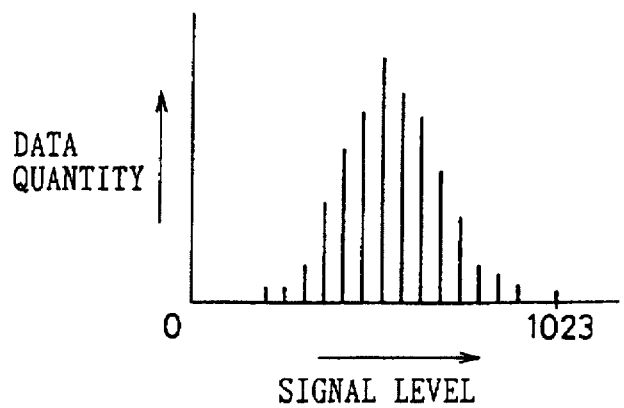
FIG. 3A is an example of a histogram of image signals.

Now referring to the drawings, preferred embodiments of the invention are described below.

FIG. 1 is a block diagram showing a configuration in accordance with an embodiment of the invention. This X-ray imaging apparatus comprises an X-ray source 1 for generating X-rays toward a subject OBJ, a CCD sensor 2 for detecting an image having passed through the subject OBJ, a preliminary amplifier 3 for amplifying an image signal from the CCD sensor 2, an AD converter 4 for converting an analog signal outputted from the preliminary amplifier 3 into a digital signal, an MPU (microprocessing unit) 5 for processing various signals, such as an image signal, in accordance with a predetermined program, an image memory 7 for storing image signals, a display unit 6, such as a CRT (cathode-ray tube) or a liquid crystal display panel, for displaying image signals, and an image storage unit 8 for storing a larger amount of data.

The operation of the apparatus will be described below. When X-rays are generated from the X-ray source 1 in accordance with predetermined imaging conditions (tube voltage, tube current, irradiation time, etc.), an image of X-rays having passed through the subject OBJ, such as teeth, is converted into an electrical signal by the CCD sensor 2. At this time, the CCD sensor 2 outputs an analog signal proportional to the intensity of the X-rays having received by the sensor.

The analog signal is amplified by a predetermined amplification factor by the preliminary amplifier 3 at the next stage, and converted into a digital signal with a quantum of 8 to 16 bits, for example, by the AD converter 4 provided at the further next stage, and then stored in the image memory 7 via the MPU 5. As a result, an image signal having a linear relationship to the X-ray intensity can be obtained.

Next, the MPU 5 reads the linear image signal stored in the image memory 7 and processes the signal; logarithmically converts the signal into 8-bit data, for example and stores the data in the image memory 7.

FIG. 2 is a flowchart showing a signal processing operation in accordance with the invention. First, in step s1, X-ray imaging is performed in accordance with the procedure described above, an image signal linear to the intensity of X-rays is converted into digital data and stored in the image memory 7 as digital data.

Next, in step s2, the MPU 5 detects the maximum from among the image data stored in the image memory 7, and the maximum is set as reference value N0. This maximum corresponds to the maximum X-ray dosage data.

When the reference value N0 is extracted, it is preferable that a histogram of image signals is created, that the image signals are accumulated in increasing order of the signal level, and that the reference value N0 is extracted in a range wherein the quantity of the accumulated data corresponds to 80 to 100% of the whole data. With this procedure, any adverse effects of high-density noise can be prevented even when such noise is superimposed.

Figure 3B:
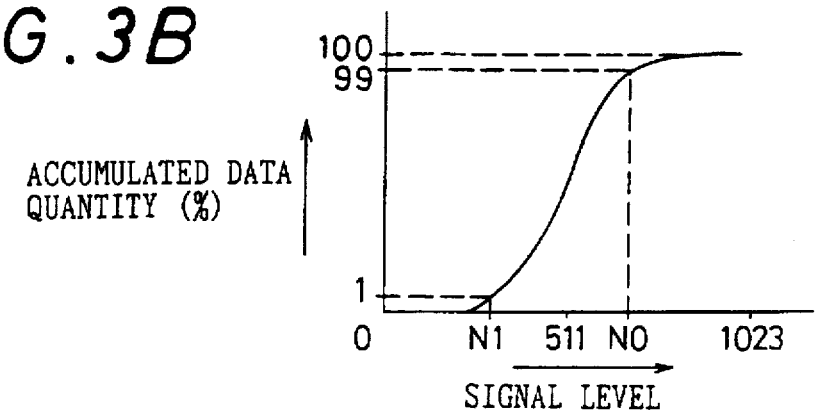
FIG. 3B is a graph showing data quantity accumulated in increasing order of image signal level by using the image signals shown in FIG. 3A.

FIG. 3A is an example of a histogram of image signals. FIG. 3B is a graph showing data quantity accumulated in increasing order of image signal level by using the image signals shown in FIG. 3A. In this graph, the signal level corresponding to 99% of the accumulated data quantity is extracted as the reference value N0. By this extraction, signal levels higher than the reference value N0 are regarded as high-density noise and eliminated. As a result, an essential image including information useful for diagnosis can be displayed at proper contrast. The accumulated data quantity corresponding to the reference value N0 is not limited to 99%, but a value in the range of 80% to 100% should preferably be selected.

Next, in step s3, the MPU 5 logarithmically converts the image data N of the image memory 7 in accordance with the following equation (a) and stores the converted data in the image memory 7.

$$d = \beta \cdot \log(N0/N) \quad \ldots (a)$$

where d is image data after correction and has a logarithmic relationship to the X-ray intensity.

Furthermore, $\beta$ is a preset constant and can be previously determined experimentally. When a display region is in the range of 1 (the maximum level of the X-ray intensity) and 0.16 (the minimum level of the X-ray intensity), and when the number of quantization steps is 255, the constant can be determined in accordance with the following calculation:

$$\beta = 255/\log(1/0.16) = 139$$

In addition, the constant $\beta$ can be reset each time X-ray imaging is performed. In this case, when reference value N1 at which a X-ray dosage is low and the signal level is minimum is extracted from the linear image data stored in the image memory 7. When the quantization maximum after density correction is dmax, the constant $\beta$ can be determined by the following equation (b):

$$\beta = dmax/(\log(N0/N1)) \quad \ldots (b)$$

When the reference value N1 is extracted, it is preferable that a histogram of image signals is created as shown in FIG. 3, that the image signals are accumulated in increasing order of the signal level, and that the reference value N1 is extracted in a range wherein the quantity of the accumulated data corresponds to 0% to 20% of the whole data. With this procedure, any adverse effects of high-density noise can be prevented even when such noise is superimposed. Although the accumulated data quantity corresponding to the reference value N1 is set to 1% as an example, the quantity is not limited to 1%, but should preferably be set to a value in the range of 0% to 20%.

Furthermore, the following procedure may be used to determine the constant $\beta$. In the same way as described above, when the reference value N1 at which the X-ray dosage is low and the signal level is minimum is extracted from the image data. When the quantization maximum after density correction is dmax, constant $\beta 1$ is determined by the following equation:

$$\beta 1 = dmax/(\log(N0/N1))$$

Next, constant $\alpha = N0/N1$ is previously determined in the range of 0.08 to 0.23, and constant $\beta 2$ is determined by the following equation:

$$\beta 2 = dmax/\log(\alpha)$$

Then, the constant $\beta 1$ is compared with the constant $\beta 2$ and the larger one is adopted as the constant $\beta$. According to experiments by the inventors, it is found that the constant $\alpha$ should preferably be close to 0.16 and that the most easy-to-observe image can be displayed in this case.

As described above, by comparing the constant $\beta 1$ extracted each time imaging is performed with the previously determined $\beta 2$, and by selecting the one capable of delivering proper contrast, an easy-to-observe image capable of delivering proper contrast can be obtained even when the incoming X-ray dosage changes greatly depending on the subject conditions and the imaging conditions.

The image data logarithmically converted as described above is 8-bit data, for example, supplied to the display unit 6 and displayed in step s4. In addition, the data can be stored as 8-bit data, for example, in the image storage unit 8, such as a magnetic disk or a magneto-optic disk, if necessary. In this way, the quantity of conversion bits is increased to 10 to 16 bits to improve accuracy at the time of the AD conversion, and 8-bit data is used after density correction. Consequently, the quantity of image data can be reduced while its accuracy is maintained.

Figure 4:
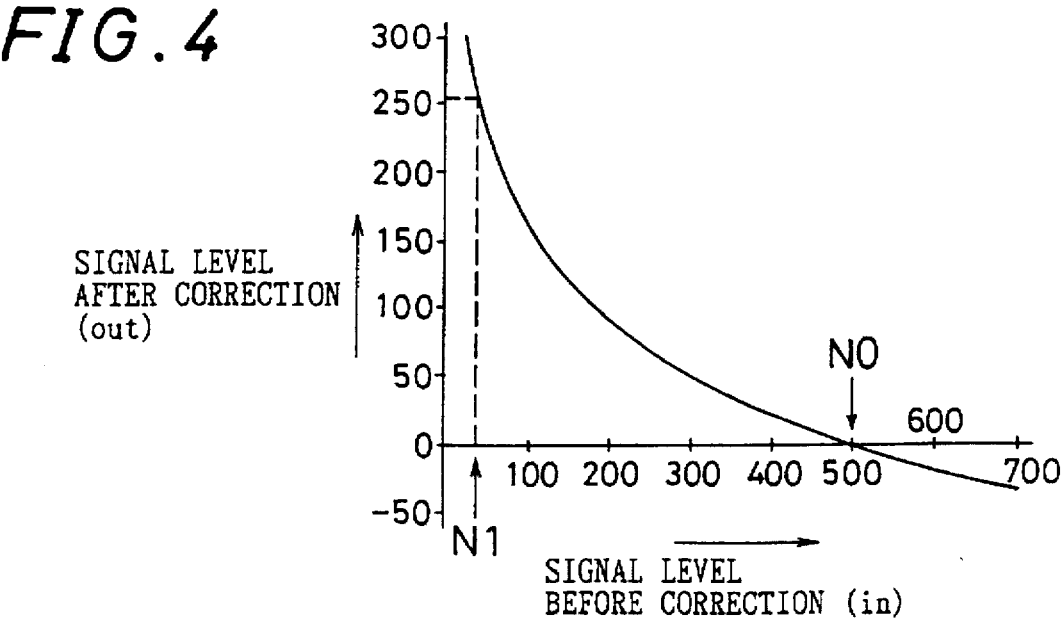
FIG. 4 is an example of a density correction graph created by logarithmic conversion.
Figure 5:
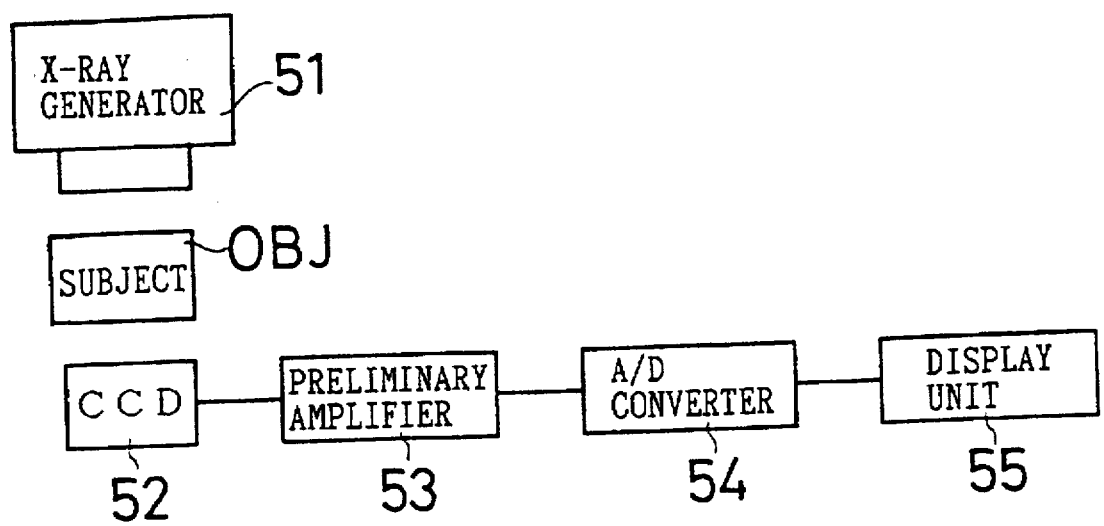
FIG. 5 is a block diagram showing an embodiment of a conventional X-ray imaging apparatus.
Figure 6A:
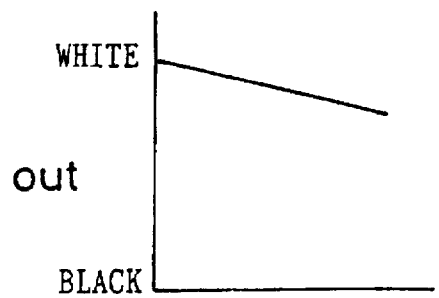
FIGS. 6A to 6C are graphs showing the relationship between input data and display density after AD conversion.
Figure 6B:
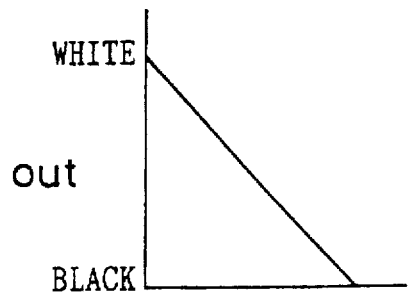
Figure 6C:
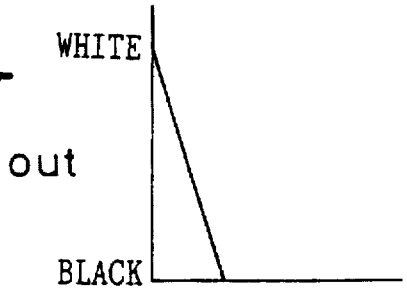

FIG. 4 is an example of a density correction graph created by logarithmic conversion. The image signal before correction is AD-converted into 10-bit data, for example, and the signal level "in" is a value in the range of 0 to 1023. The image signal after correction is represented by 8-bit digital data, and signal level "out" is a value in the range of 0 to 265.

The curve indicates a logarithmic function as a whole. In order to apply the negative/positive relationship of the present apparatus to that of the conventional X-ray film, as the incoming X-ray dosage is greater, the signal level before correction is higher, and the signal level after correction is lower (the display screen becomes blackish). The position of the intersection of the curve and the abscissa corresponds to the reference value N0. Furthermore, the position of the intersection of the curve and the line corresponding to a signal level of 255 after correction corresponds to the reference value N1.

Since the image information of the subject can be reproduced faithfully by performing density correction using logarithmic conversion, the image can be displayed at stable contrast even when the X-ray dosage fluctuates.

Although the CCD sensor 2 is taken as an example of an X-ray imaging device for delivering an image signal proportional to an incoming X-ray dosage in the above-mentioned explanation, other devices, such as a MOS sensor and an ionization chamber, can also be used.

The invention may be embodied in other specific forms without departing from the spirit or essential characteristics thereof. The present embodiments are herefore to be considered in all respects as illustrative and not restrictive, the scope of the invention being indicated by the appended claims rather than by the foregoing description and all changes which come within the meaning and the range of equivalency of the claims are herefore intended to be embraced therein.

What is claimed is:

1. An X-ray imaging apparatus comprising:

an X-ray imaging means for detecting an image of X-rays having passed through a subject and for outputting an image signal proportional to the dosage of incoming X-rays;

an AD converting means for AD-converting the image signal outputted from the X-ray imaging means;

an image memory for storing the image signal having been converted into digital data by the AD converting means;

a maximum reference value extracting means for extracting reference value N0 at which the X-ray dosage is high and the signal level is maximum, from the images stored in the image memory; and a logarithmic converting means for logarithmically converting image signal N stored in the image memory in accordance with the following equation:

$$d = \beta \cdot \log(N0/N)$$

wherein d is an image signal after correction, and $\beta$ is a constant.

2. A method of performing an automatic density correction in an X-ray imaging apparatus which utilizes an X-ray imaging means detecting an image of X-rays having passed through a subject and outputting an image signal proportional to the dosage of incoming X-rays, said method comprising the steps of:

AD-converting an image signal outputted from the X-ray imaging means into an image signal with digitized data and storing the image signal with digitized data into an image memory;

extracting reference value N0 at which the X-ray dosage is high and the signal level is maximum, from the images stored in the image memory; and logarithmically converting image signal N stored in the image memory in accordance with the following equation:

$$d = \beta \cdot \log(N0/N)$$

wherein d is an image signal after correction, and $\beta$ is a constant.

3. The method according to claim 2, wherein in the extracting step, a histogram of the image signals N is created, the image signals N are accumulated in increasing order of signal level, and the reference value N0 is extracted in a range wherein the quantity of the accumulated data corresponds to 80 to 100% of the whole data.

4. The method according to either claim 2 or claim 3, wherein reference value N1 at which the X-ray dosage is low and the signal level is minimum is extracted from the images stored in the image memory, and when the quantization maximum after density correction is dmax, the constant $\beta$ is determined by the following equation:

$$\beta = dmax/(\log(N0/N1)).$$

5. The method according to claim 4, wherein when the reference value N1 is extracted, a histogram of the image signals N is created, the image signals are accumulated in increasing order of signal level, and the reference value N1 is extracted in a range wherein the quantity of the accumulated data corresponds to 0 to 200% of the whole data.

6. The method according to claim 2, wherein reference value N1 at which the X-ray dosage is low and the signal level is minimum is extracted from the images stored in the image memory, and when the quantization maximum after density correction is dmax, a constant $\beta 1$ is determined by the following equation:

$$\beta 1 = dmax/(\log(N0/N1))$$

while a constant $\alpha = N0/N1$ is previously determined in the range of 0.08 to 0.23, and a constant $\beta 2$ is determined by the following equation:

$$\beta 2 = dmax/\log(\alpha)$$

and then the constant $\beta 1$ is compared with the constant $\beta 2$ to adopt a greater one of the constants as the constant $\beta$.

* * * * *